United States Patent [19]

Mizukami

[11] 4,214,262
[45] Jul. 22, 1980

[54] DIGITAL APPARATUS FOR CORRECTING A TIME-BASE ERROR IN A TELEVISION VIDEO SIGNAL

[75] Inventor: Mineo Mizukami, Tokyo, Japan

[73] Assignee: Nippon Electric Co., Ltd., Tokyo, Japan

[21] Appl. No.: 941,936

[22] Filed: Sep. 13, 1978

[30] Foreign Application Priority Data

Sep. 13, 1977 [JP] Japan ................................ 52-110747

[51] Int. Cl.² ............................................. H04N 9/46
[52] U.S. Cl. ........................................... 358/19; 358/8
[58] Field of Search ........................... 358/4, 8, 19, 20; 360/36, 38

[56] References Cited

U.S. PATENT DOCUMENTS

| | | | |
|---|---|---|---|
| 3,971,063 | 7/1976 | Michael et al. | 358/8 |
| 3,978,519 | 7/1976 | Stallet et al. | 358/8 |
| 4,015,288 | 3/1977 | Ebihara et al. | 358/8 X |
| 4,018,990 | 4/1977 | Long et al. | 358/8 X |
| 4,024,571 | 5/1977 | Dischert et al. | 358/8 X |
| 4,062,041 | 12/1977 | Tallent et al. | 358/8 |
| 4,127,866 | 11/1978 | Yamashita | 358/8 X |

*Primary Examiner*—Terrell W. Fears
*Assistant Examiner*—Donald McElheny, Jr.
*Attorney, Agent, or Firm*—Hopgood, Calimafde, Kalil, Blaustein & Lieberman

[57] ABSTRACT

A digital time base corrector for correcting a time-base error in a television video signal, the video signal including a horizontal synchronizing signal and a color burst signal. The start of a write-in clock pulse oscillator is determined by a one-cycle portion of the color burst signal which has been extracted from the video signal in a prefixed phase relationship with the horizontal synchronizing signal. Oscillation frequency control at the write-in clock pulse oscillator is performed in response to the phase deviation of the write-in clock pulse from the extracted one-cycle burst signal portion. Phase-locking of the write-in clock pulse oscillator is performed in response to the phase difference, from the extracted one-cycle burst portion, of a selected one of first and second pulses, the first pulse occurring at the rate of the subcarrier signal and the second pulse occurring at the rate of the horizontal synchronizing pulse. Both pulses are obtained from the write-in clock pulse. The present invention adapts the time-base corrector to allow broader phase fluctuations of the write-in clock pulse with respect to the color burst and the horizontal synchronizing signal of the incoming video signal.

6 Claims, 5 Drawing Figures

FIG. I

DIGITAL APPARATUS FOR CORRECTING A TIME-BASE ERROR IN A TELEVISION VIDEO SIGNAL

FIELD OF THE INVENTION

This invention relates generally to a time-base corrector (hereinafter TBC) for correcting a time-base error involved in a television video reproduced from a video tape recorder (hereinafter VTR), and more particularly, to a digital TBC in which a write-in clock pulse, used for writing a digitized video signal into a memory, is generated in an improved manner.

BACKGROUND OF THE INVENTION

In a conventional digital TBC, as described in the U.S. Pat. Nos. 3,909,839 and 4,065,787, an input video signal, having a time-base error due to fluctuations in relative speed between tape transport speed and head rotation speed, is digitized and stored in a digital memory in response to a write-in clock pulse train which also includes a time-base error component. The stored digitized video signal is read out in response to a read-out clock pulse train which does not include the time-base error component. In such a conventional digital TBC, the maximum tolerable frequency range, in which the frequency of the write-in clock pulse train can follow the time-base fluctuation in the input video signal, is such that the phase difference between a color subcarrier in the input video signal and the write-in clock pulse for one horizontal scanning period (1H), corresponds to a period equal to one cycle period of the color subcarrier. When the sensitivity of a voltage sensor, provided in a phase locked loop for generating the write-in clock pulse, phase-locked to the subcarrier contained in the input video signal, is lowered to widen the frequency range, more than one stabilized point in the phase locked loop results. This result makes it impossible to achieve writing in of the digitized video signal in the proper sequence.

It is therefore an object of the present invention to provide a digital time-base corrector in which the write-in clock pulse generated by the phase locked loop can follow greater time-base fluctuations in the input video signal.

SUMMARY OF THE INVENTION

In accordance with an aspect of the invention, said input video signal, to be digitized and stored in a memory, includes a horizontal synchronizing signal and a color burst signal.

It is a feature of the invention that a one-cycle burst pulse is produced in response to said color burst signal, said one-cycle burst pulse having a predetermined phase relationship with said horizontal synchronizing signal.

It is another feature of the invention that the phase difference between said one-cycle burst pulse and a generated pant pulse is utilized to control the frequency of the write-in clock pulse whereby said write-in clock pulse can follow wide time-base fluctuations in the input video signal.

It is another object of the present invention to provide a digital time-base corrector capable of correct reproduction of a color video signal from a VTR-reproduced video signal.

The object and features of the invention will be better understood from the following description taken in conjunction with accompanying drawings.

DETAILED DESCRIPTION

Figure 1:
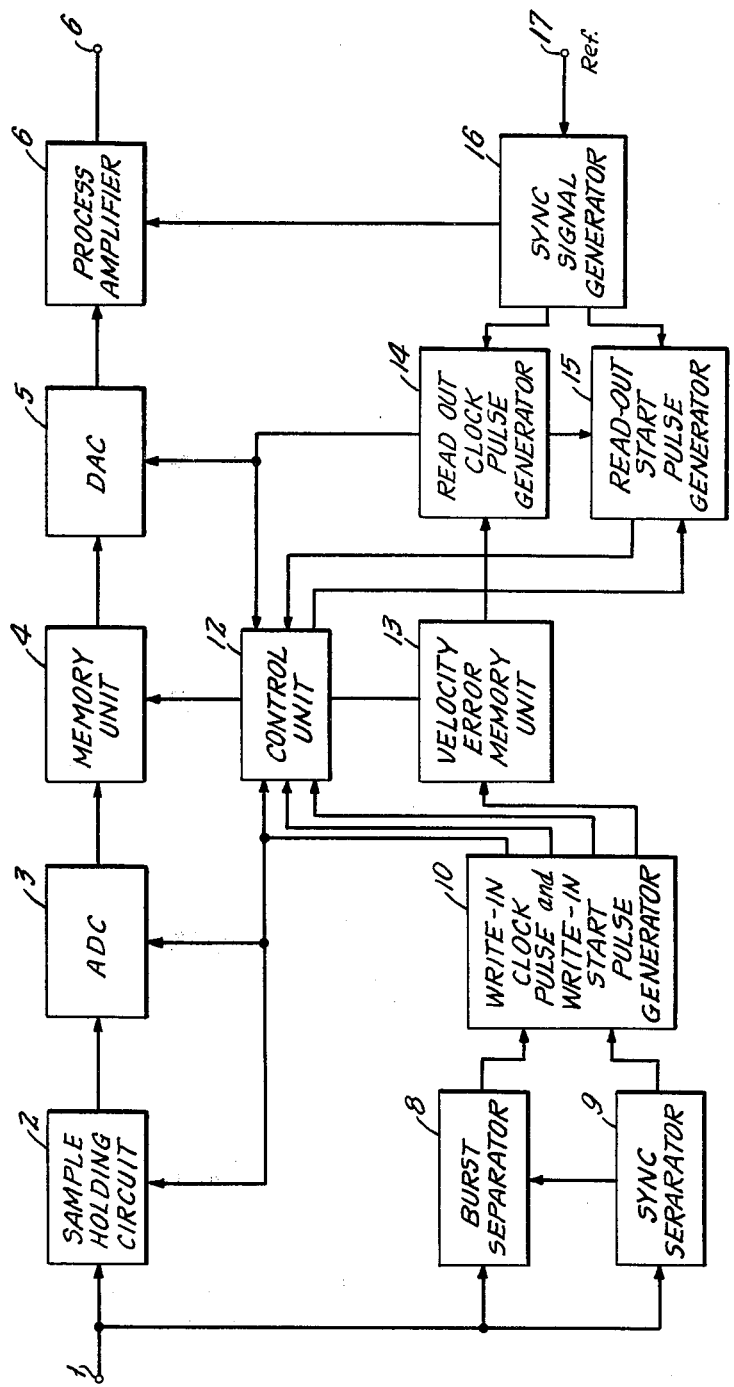
FIG. 1 is a block diagram of a digital time-base corrector in accordance with the present invention.

Referring to FIG. 1, a composite video signal containing time-base errors is fed from an input terminal 1 to a sampling/holding circuit 2, a burst separator 8 and a synchronizing signal separator (sync separator) 9. The sync separator 9 generates a horizontal synchronizing signal and a burst gate pulse which are fed to a write-in clock and start pulse generator 10 and burst separator 8, respectively. The burst separator 8 generates burst pulses corresponding to the color burst signal contained in the composite video signal. The burst pulses are supplied to the pulse generator 10.

The pulse generator 10 generates a write-in clock pulse train which is phase locked with the burst pulses. The write-in clock pulse train is fed to the sampling-/holding circuit 2, an analog/digital converter (ADC) 3 and a control circuit 12. The pulse generator 10 also generates a velocity error signal representing the phase difference between the burst pulses in two adjacent horizontal scanning periods. The error signal is fed to a velocity error memory unit 13. The sampling/holding circuit 2 samples the composite video signal, utilizing the write-in clock pulse train as sampling pulses, and holds the sampled signal. The analog/digital converter 3 converts the output of the sampling/holding circuit 2 into the digital format, and feeds the output of circuit 2 to a memory unit 4. The pulse generator 10 supplies a write-in start pulse, which determines the starting point for each horizontal scanning period (line) to be written into the memory unit 4, and feeds the start pulse to the control circuit 12. The pulse generator 10 also produces on odd/even line control signal, indicating whether each written-in line is an odd line or an even line, and the odd/even line control signal is fed to the control circuit 12. Since the number of subcarrier cycles contained in one line is 455/2 in an NTSC system, the control signal is used for switching the number of subcarrier cycles between 227 and 228 for every line written into the memory unit 4.

On the read-out side, a sync signal generator 16 generates a composite synchronizing signal, color burst signal and blanking signal synchronized with a reference synchronizing signal supplied from terminal 17. These signals are supplied to the process amplifier 6 which includes a low-pass filter. The sync signal generator 16 also generates a reference color subcarrier signal and a reference horizontal synchronizing signal, and supplies them to a read-out clock pulse generator 14 and a read-out start pulse generator 15, respectively. In the clock pulse generator 14, the reference color subcarrier signal is phase-shifted in response to the velocity error signal supplied from the velocity error memory unit 13, and tripled in frequency to produce a read-out clock pulse train. The read-out clock pulse train is supplied to the control circuit 12 and to a digital/analog converter (DAC) 5. The read-out start pulse generator 15, in response to the reference horizontal synchronizing signal, read-out clock pulse train and the odd/even line control signals from the control circuit 12, produces a start pulse which determines the read-out timing for memory unit 4. This start pulse is applied to the control circuit 12, which in turn supplies each unit with required signals.

Figure 2:
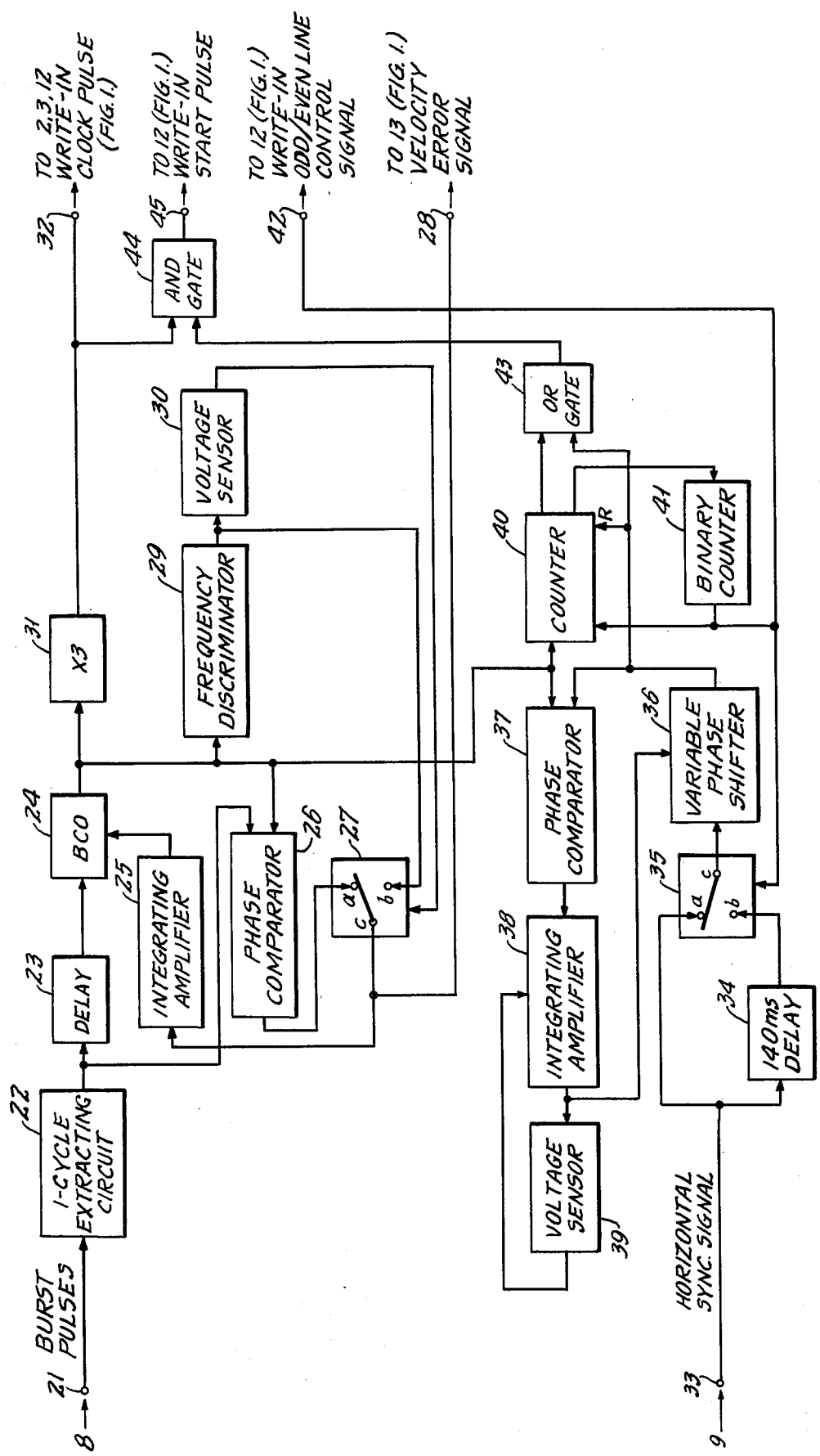
FIG. 2 shows, in block diagram form, a portion of a conventional digital time-base corrector.

FIG. 2 shows, in block diagram form, a write-in clock and start pulse generator 10 in a conventional digital TBC. In FIG. 2, the burst pulses separated from the video signal are supplied from a terminal 21 to a one-cycle gate pulse generator 22. In generator 22, the sixth, for example, of the incoming eight burst pulse train is extracted and fed to a delay means 23 having a delay period equal to one cycle of the burst signal. The extracted pulse is also fed to phase comparator 26. A burst controlled oscillator (BCO) 24 is supplied with the one-cycled delayed burst pulse from the delay means 23 and a control signal from the integrating amplifier 25. The starting phase and the frequency of oscillation are controlled by the one-cycle delayed burst pulse, and the control signal respectively, to thereby produce a color subcarrier synchronized with the burst signal. The produced color subcarrier is supplied to the frequency tripler 31, phase comparator 26, frequency discriminator 29, phase comparator 37 and counter 40.

The phase comparator 26 compares the phases of the extracted burst pulse, from the one-cycle burst pulse generator 22, and the output signal of BCO 24. Since the output of BCO 24 has a starting phase of oscillation determined by the one-cycle delayed burst pulse belonging to an immediately preceding line, the output of the phase comparator 26 represents the phase deviation of the burst pulse in a 1H period, i.e., the velocity error. The output of phase comparator 26 is fed via a switch 27 to integrating amplifier 25 and velocity error output terminal 28.

The frequency discriminator 29 detects the difference between the oscillation frequency of BCO 24 and a reference frequency of 3.579545 MHz, to thereby generate a frequency error voltage, which is fed to a voltage sensor 30 and switch 27. In response to the frequency error voltage from the discriminator 29, the voltage sensor 30, when it has detected a voltage above a preset voltage turns the movable contact c of the switch 27 from the fixed contact a to the fixed contact b. The present voltage corresponds to the frequency deviation of the BCO's output by, for example, ±0.3% or more from the reference frequency. The frequency error voltage is thus fed, via the switch 27, to the integrating amplifier 25 and to velocity error output terminal 28. The number of cycles of the oscillation output of BCO 24 should normally alternate between 227 and 228 for successive lines, i.e., at a repetition period of the one-cycle burst pulse, as long as movable contact c of switch 27 stays in contact with contact a. The oscillation output of BCO 24 however, is sometimes erroneously locked even if the number of cycles alternates between 228 and 229 or between 226 and 227. With alternating of this magnitude the deviation of the oscillation frequency is greater than ±0.3%. In such an instance the frequency error voltage from the discriminator 29 is supplied to the integrating amplifier 25 so that the oscillation frequency of the BCO 24 is brought closer to the normal frequency.

A horizontal sync signal from the frequency separator circuit 9 (FIG. 1), is supplied to input terminal 33 and fed to the fixed contacts a and b of switch 35 directly and via delay means 34 having a delay time of 140 ns. The switch 35, controlled by the write-in odd/even line control signal generated by the output of the binary counter 41, alternates between contacts a and b for every line change. The horizontal sync signal from switch 35, after being phase-shifted in response to variable phase shifter 36, is fed to phase comparator 37, counter/decoder 40 and OR gate 43. Phase comparator 37 compares the phase of output of the BCO 24 with the output of phase hifter 36. The resultant comparison is fed via integrating amplifier 38 to voltage sensor 39 and phase shifter 36. The voltage sensor 39, which eventually detects the quantity of the phase shift in the input horizontal sync signal, given by the variable phase shifter 36, provides an output, when the output voltage, supplied to the phase shifter 36, from the integrating amplifier 38, corresponds to a phase shift beyond the subcarrier period. The output of the voltage sensor is supplied to the integrating amplifier 38 to reset the integrated value, once whereby the amount of phase shift is restrained within one cycle period of the subcarrier.

From the foregoing it is clear that the output of phase shifter 36 is brought into phase with that of the BCO 24. Therefore, the resetting of counter decoder 40 and the gating signal applied to AND gate 44, to which the output of the phase shifter 36 is directly supplied and supplied through OR gate 43, respectively, are timed with the output of the BCO 24. Thus, one of the write-in clock pulses is gated through AND gate 44 and fed to the terminal 45 as a write-in start pulse.

Counter/decoder 40 has a counter which provides one output pulse for every 227 or 228 pulses supplied from BCO 24. This counter is reset by the output of phase modulator 36. Counter/decoder 40 also has a circuit which produces a self-clearing pulse when the counter output is zero, and another circuit for producing a pulse approximately one half of 1H period subsequent to said self-clearing pulse. Of these outputs from counter/decoder 40, the former (self-clearing pulse) is fed to OR gate 43 and the latter, to binary counter 41. Therefore, when the horizontal sync signal, supplied at terminal 33 is lost due to dropout and other transients in the VTR, the above-mentioned self-clearing pulse serves as the write-in start pulse.

The write-in odd/even line control signal from binary counter 41 is fed to switch 35 for the even-odd line adjustment. Also, the output of counter 41 is fed to counter/decoder 40 to selectively set the numbers of BCO output pulses which cause the counter 40 to provide a one count-down output pulse. Thus, when contact a of the switch 35 is in contact with movable contact c the counter provides an output pulse for every 228 BCO output pulses, and when contact b is, the counter provides an output pulse for every 227 BCO output pulses. The write-in odd/even line control signal is also fed to control circuit 12 (FIG. 1) via the terminal 42.

Figure 3:
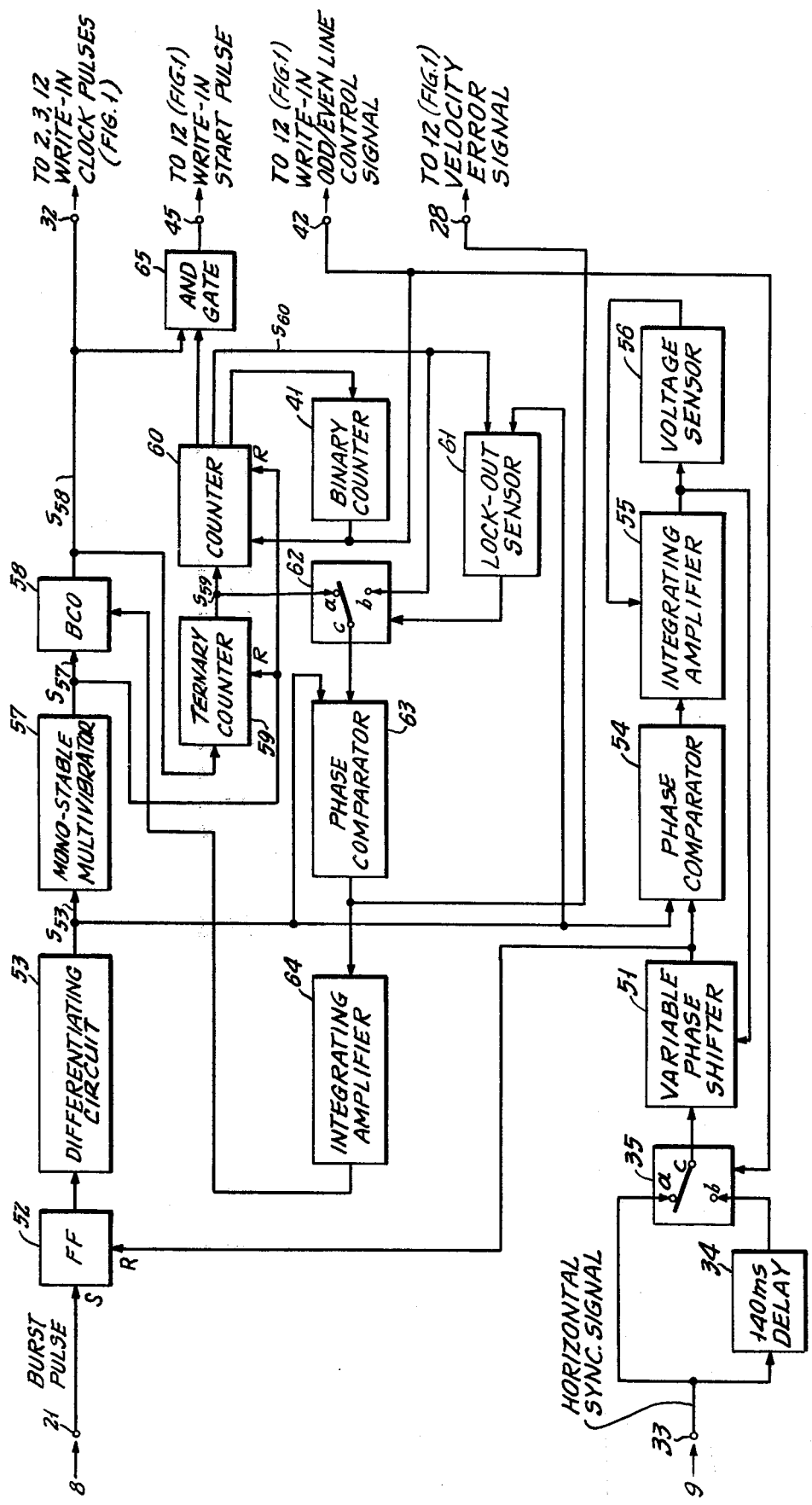
FIG. 3 shows, in block diagram form, a portion of an improved digital time-base corrector in accordance with the invention, the position corresponding to the portion shown in FIG. 2.

FIG. 3 illustrates in block diagram form, a write-in clock and write-in start pulse generator for a digital TBC in accordance with the instant invention. Like reference numerals in FIGS. 2 and 3 denote like structural elements. In the embodiment of FIG. 3 horizontal synchronizing signal, supplied from the sync separator circuit 9 (FIG. 1) to terminal 33, is applied directly to contact a the switch 35 and applied to contact b through the delay means 34. The horizontal sync signal supplied through the contact c of the switch 35 undergoes a phase shift at variable phase shifter 51, whose output is in turn supplied to the reset terminal of a flip-flop (FF) 52. The burst pulses, supplied from the burst separator circuit 8 (FIG. 1), to the terminal 21, is applied to the set terminal of the FF 52. The output of the phase shifter 51 serves to reset FF 52 in the middle of the burst pulse train and before the next burst pulse train arrives. Thus FF 52 is set by a certain burst pulse in a train of burst pulses. The output of the FF 52 is supplied to a phase comparator 54 through a differentiating circuit 53. The differentiated output of the circuit 53 is also supplied to a monostable multivibrator 57, another phase comparator 63 and a lock-out sensor 61.

The control loop, including the phase comparator 54, serves to keep the phase difference between the two inputs to the comparator 54 equal to one half of one subcarrier period. The output of the phase comparator 54 is integrated at an integrating amplifier 55 and supplied to the variable phase shifter 51 with the result that the resetting of FF 52 occurs about in the middle of the burst pulse train and in a pulse-to-pulse interval. The output of the integrating amplifier 55, when detected at a voltage sensor 56 having a preset reference voltage for detection, is fed back to the integrating amplifier 55. This voltage sensor 56 is similar to the voltage sensor 39 shown in FIG. 2. The extraction at FF 52 of the one-cycle burst pulse differs from the burst pulse extraction of the conventional device illustrated in FIG. 2 in the following respect:

Whereas the sixth burst pulse from the burst pulse train should be extracted in the conventional device, the pulses corresponding to the first few cycles of the burst signal sometimes remain undetected by the burst separator circuit 8 (FIG. 1). The result is that the time position of the sixth burst pulse relative to the horizontal sync signal is not absolutely fixed. In contrast, the one-cycle burst pulse extracted by FF 52 in the present invention, is in a strictly defined phase relationship with the horizontal sync signal. Moreover, the 180° phase difference of the subcarrier for every two adjacent lines in the NTSC system is compensated for by alternating the contact of the switch 35 between a and b for every line change.

The one-cycle burst pulse extraction method employed in the present invention, makes it possible readily to control the frequency of BCO 58 over a wide range. BCO 58, whose starting phase of oscillation is determined by the leading edge of the output of monostable multivibrator 57, generates the write-in clock frequency which is three times greater than the subcarrier frequency. The output of BCO 58 is supplied to terminal 32 for use as write-in clock pulses. The output of BCO 58 is also frequency-divided at a ternary counter 59 into the subcarrier frequency. The ternary counter 59 is reset to zero by the output of the monostable multivibrator 57. The output of the ternary counter 59 is supplied to contact a of switch 62 and to counter 60. The phase of the output of the ternary counter 59, supplied through switch 62, is compared at comparator 63 which that of the output of the FF 52 supplied through the differentiating circuit 53. The output of comparator 63 is supplied to BCO 58 through an integrating amplifier 64 to control the oscillation frequency of BCO 58.

Figure 3A:
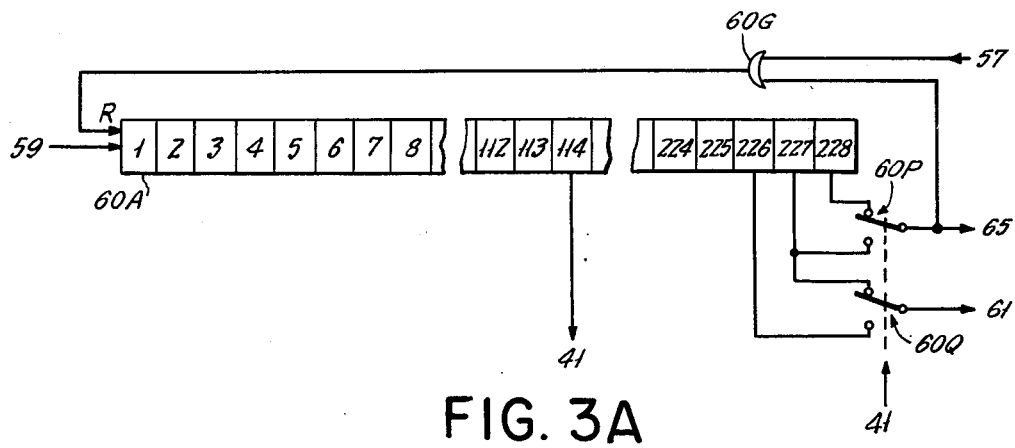
FIG. 3A is a block diagram of a pulse generator employed in the portion shown in FIG. 3.

Referring to FIG. 3A, which illustrates the details of counter 60, it can be seen that this counter has a 228-stage shift register 60A supplied with the output pulse from ternary counter 59. The outputs of the 227th and 228th stages of the shift register 60A are connected to two fixed contacts of a switch 60P, whose movable contact is connected to the AND gate 65. The counter output at the movable contact of the switch 60P is also connected to the reset terminal R through an OR gate 60G whose other input terminal is connected to the monostable multivibrator 57. The outputs of the 226th and 227th shages of the shift 60A are connected to the fixed contacts of another switch 60Q whose movable contact is connected to the lock-out sensor 61. The output of the 114th stage is connected to the binary counter 41 to define the middle of each line. The switches 60P and 60Q are driven by the output of the binary counter 41 to alternate between the odd-numbered and even-numbered lines. The output of the binary counter 41, indicating whether the line under the write-in process is odd-numbered or even-numbered, is supplied to the switch 35, counter 60 and the output terminal 42 of the write-in odd/even line control signal. The AND gate 65, serves to extract one of the output pulses of BCO 58 and fed the pulse to terminal 45 as a write-in start pulse.

From the outputs of counter 60 the above-mentioned point pulse, generated one clock period ahead of the self-clearing pulse, is also supplied to the lock-out sensor 61. The lock-out sensor 61 detects the phase difference between the point pulse and differentiated output of the FF52. When a difference exceeding one subcarrier period continues to exist for a certain length of time, which period may be a 10 line period or greater, the sensor 61 provides a switching pulse to the switch 62 to select the contact b. The lock-out sensor 61 may be composed of an integrated circuit Model SN74123 which serves as a re-trigger multivibrator. When the oscillation frequency of BCO 58 widely fluctuates and contact b is selected in the switch 62, it is possible to detect, without fail, the greatest possible difference between the oscillation phase at BCO 58 and the phase of the output of FF52, thereby determining the next starting phase of the oscillation, and returning the oscillation frequency of BCO 58 to the desired frequency. Thus, when the countdown output of the counter 60 is brought into synchronism with the differentiated output of the FF52, the period of the oscillating output of BCO 58 will become equal to $(1/227 \times 3)$ or $(1/228 \times 3)$ of that of the differentiated FF52 output. The oscillation frequency of the BCO 58 will then be exactly three times the frequency of the color subcarrier. The controllable frequency range of the BCO 58 is, because of the absence of a frequency discriminator corresponding to the discriminator 29 of FIG. 2, the range in which the BCO 58 can vary in response to an external control voltage. Therefore even wide time-base fluctuations of an input composite video signal, for instance fluctuation of ±1%, can be faithfully followed.

Figure 4:
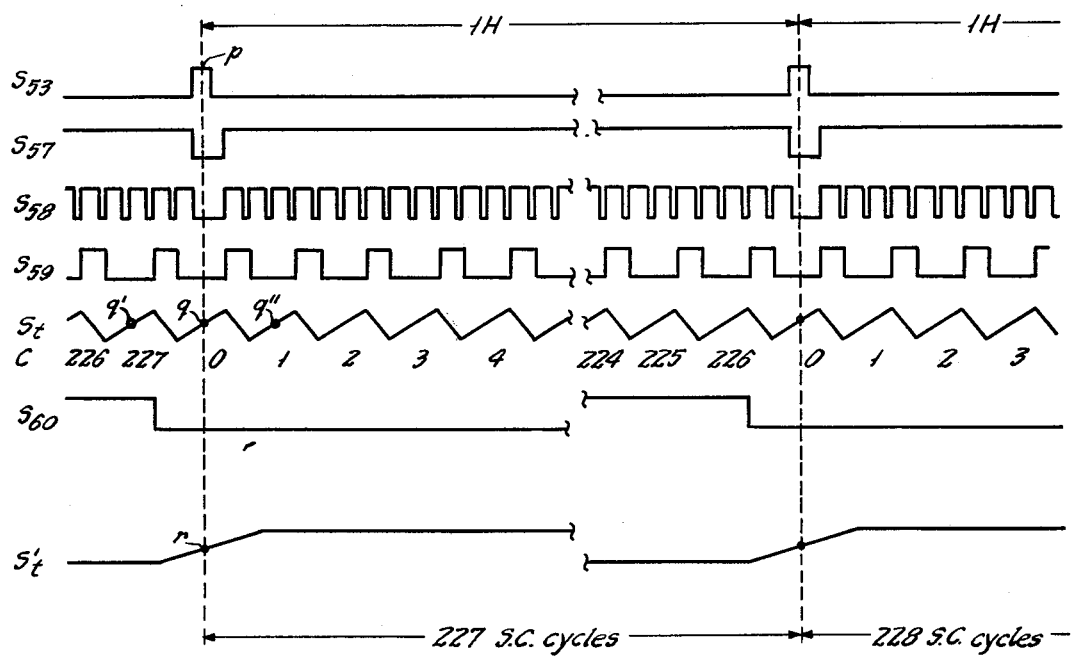
FIG. 4 illustrates a timing diagram for various parts of the portion shown in FIG. 3.

FIG. 4 illustrates wave forms descriptive of the control of the oscillation frequency of BCO58. Signal $S_{53}$ denotes the output of the differenting circuit 53, signal $S_{57}$ denotes the output of the monostable multivibrator 57; signal $S_{58}$ denotes the output of BCO 58; and signal $S_{59}$ denotes the output of the ternary counter 59 having a frequency equal to the subcarrier. Trapezoidal wave $S_t$ is produced at the phase comparator 63 from the signal $S_{59}$ for the comparison with the signal $S_{53}$. The numerals denoted by C represent the count at the counter 60, which ranges from 0 to 226 or 227 depending on whether the line is odd-numbered or even-numbered. A signal $S_{60}$ represents the point pulse which is generated at the counter 60. The signal $S_{60}$ is generated for both even-numbered and odd-numbered lines. A trapezoidal wave $S_t'$ is produced at the phase comparator 63 from the signal $S_{60}$ for the comparison with the signal $S_{53}$.

Referring further to FIG. 4 and to FIG. 3, the output of the BCO 58 is synchronized with the burst pulse, and the oscillation frequency of the BCO 58 fully follows the input. When the phase difference between the output of the BCO 58 and the input burst is within one subcarrier period, the contact a of the switch 62 (FIG. 3) is selected, and a point p on the differentiated pulse $S_{53}$ and a point q of the signal $S_t$ are phase-compared.

If the phase difference between the output of the BCO 58 and the input burst is more than one subcarrier peiod, the contact b of the switch 62 is selected, and the point p on the signal $S_{53}$ and a point r of signal $S_t'$ are phase-compared. In this instance, the output frequency of the BCO 58 is securely controlled in accordance with the phase difference between points p and r to follow the input burst. If the contact a of the switch 62 is in contact with contact c, even though the phase difference between the output of the BCO 58 and the input burst is more than one cycle period of the subcarrier, the point p of differentiated pulse $S_{53}$ and a point q' or q'' of the signal $S_t$ will be phase-compared, resulting in the failure of the BCO 58 to faithfully follow the input burst. This is a disadvantage unavoidable to the conventional device illustrated in FIG. 2.

When the contact a is in contact with c in the switch 62, i.e. when the time-base fluctuations of the input video signal are relatively small, the control illustrated in FIG. 2 is effected, so that the output of the BCO 58 can follow the input burst in phase. When the time-base fluctuations of the input video signal become greater, contact b of the switch 62 will be selected to enable the BCO 58 to generate its output, faithfully following the input burst in phase, without adversely affecting the sequence of write-in actions. If the contact b of the switch 62 is in contact with c all the time, there will be no problem with the operation of the BCO 58 itself. However, when something from time-base fluctuations occurs, for instance when dropout noises get mixed in, FF52 will be suddenly set by a burst pulse one cycle off and, the phase comparator 63 will generate an excessively high error voltage if the contact b is active, resulting in the supply of a wrong voltage as the velocity error. As a consequence, the reproduced picture will be disengaged from color lock and random colors will be produced. Even in such a case, if contact a of switch 62 is active, a signal, one cycle off the regular signal in the outputs of the counter 59, is compared with the differentiated pulse, and consequently a nearly accurate voltage can be supplied as the velocity error, resulting in no color shear in the reproduced picture.

Since, as described above, it is possible according to this invention to provide a TBC having a write-in clock and start pulse generator, which faithfully follows even wide time-base fluctuations of a input video signal, and is immune from color shears even when dropout noises or the like get mixed in, securely color-locked pictures, free from color shears, can be obtained in still, slow-motion and quick-motion reproduction with a VTR. The invention dispenses with such parts requiring complex circuit composition as the frequency discriminator 29 and one-cycle gate pulse generator 22, which are indispensable to the conventional system shown in FIG. 2. Therefore the invention advantageously serves to nearly halve the number of components required in the write-in clock pulse and start pulse generator.

Although a specific embodiment of this invention has been shown and described it will be understood that various modifications can be made without departing from the spirit of this invention.

What is claimed is:

1. A time-base corrector providing compensation for a time-base error contained in a composite color video signal, said composite color video signal including a horizontal synchronizing signal and a color burst signal, said corrector comprising:
   (a) means for generating a first clock pulse train, the frequency of said first clock pulse train being controlled by a control signal and the starting phase of oscillation of said first clock pulse train being determined by a one cycle burst pulse;
   (b) means responsive to said first clock pulse train for encoding said composite color video signal into a digitized signal;
   (c) means for storing said digitized signal in response to said first clock pulse train;
   (d) means for producing a second clock pulse train having a predetermined phase relationship with a reference signal; and
   (e) means responsive to said second clock pulse train for reading out the digital signal stored in said memory means; said first clock pulse generating means characterized by;
   (f) means responsive to said color burst signal for producing said one-cycle burst pulse, said one-cycle burst pulse having a predetermined phase relationship with said horizontal synchronizing signal and said one-cycle burst pulse being applied to said first clock pulses generating means;
   (g) first counting means for counting said first clock pulse train and for generating a third clock pulse train, the frequency of said third clock pulse train being equal to a subcarrier frequency;
   (h) second counting means for counting said third clock pulse and for generating a point pulse when said third clock pulse count has reached a predetermined number, the frequency of said point pulse being equal to a horizontal synchronizing frequency and said third clock pulse count being different between an odd line of said video signal and an even line of said video signal; and
   (i) means for phase-comparing said one-cycle burst pulse with said point pulse, the output of said phase comparator means being supplied to said first clock pulse generating means as said control signal.

2. A time-base corrector as claimed in claim 1, in which said second counting means further comprises, means for generating a middle-point pulse at the middle point of each line, and said first clock pulse generating means further comprises, third counting means for counting said middle-point pulse and for generating a write-in odd/even line control signal, said write-in odd/even line control signal being supplied to said second counting means.

3. A time-base corrector as claimed in claim 2 in which said one-cycle burst pulse producing means further comprises:
   (a) first switching means for selectively passing said horizontal synchronizing signal and a 140 nanosecond delayed horizontal synchronizing signal in response to said write-in odd/even line control signal;
   (b) phase shifting means for shifting the output of said first switching means to locate the leading edge of said outputed horizontal synchronizing signal in the middle of said color burst signal train and in a pulse-to-pulse interval; and
   (c) bistable means for producing said one-cycle burst pulse, said bistable means having a setting terminal supplied with said color burst signal and a resetting terminal supplied with the output of said phase shifting means.

4. A time-base corrector as claimed in claim 1, in which said first clock pulse generating means further comprises:
   (a) means for generating a switching pulse when the phase difference between said point pulse and said one-cycle burst pulse exceeds a predetermined level; and
   (b) second switching means for selectively applying said point pulse and said third clock pulse to said phase comparator means in response to said switching pulse.

5. A time-base corrector as claimed in claim 4, in which said second counting means further comprises means for generating a middle-point pulse at the middle-point of each line, and said first clock pulse generating means further comprising, third counting means for counting the pulse indicating the middle of each line from said second counting means and for generating a write-in odd/even line control signal, said write-in odd/even line control signal being supplied to said second counting means.

6. A time-base corrector as claimed in claim 5, in which said one-cycle burst pulse producing means further comprises:
   (a) first switching means for selectively passing said horizontal synchronizing signal and a 140 nanosecond delayed horizontal synchronizing signal in response to said write-in odd/even line control signal;
   (b) phase shifting means for shifting the output of said first switching means to locate the leading edge of said outputed horizontal synchronizing signal in the middle of the said color burst signal train and in a pulse-to-pulse interval; and
   (c) bistable means for producing said one-cycle burst pulse, said bistable means having a setting terminal supplied with said color burst signal and a resetting terminal supplied with output of said phase shifting means.

* * * * *